Feb. 27, 1934.  W. GEYGER  1,948,912
ROTATING ARMATURE-QUOTIENT MEASURING INSTRUMENT
Filed Nov. 20, 1930
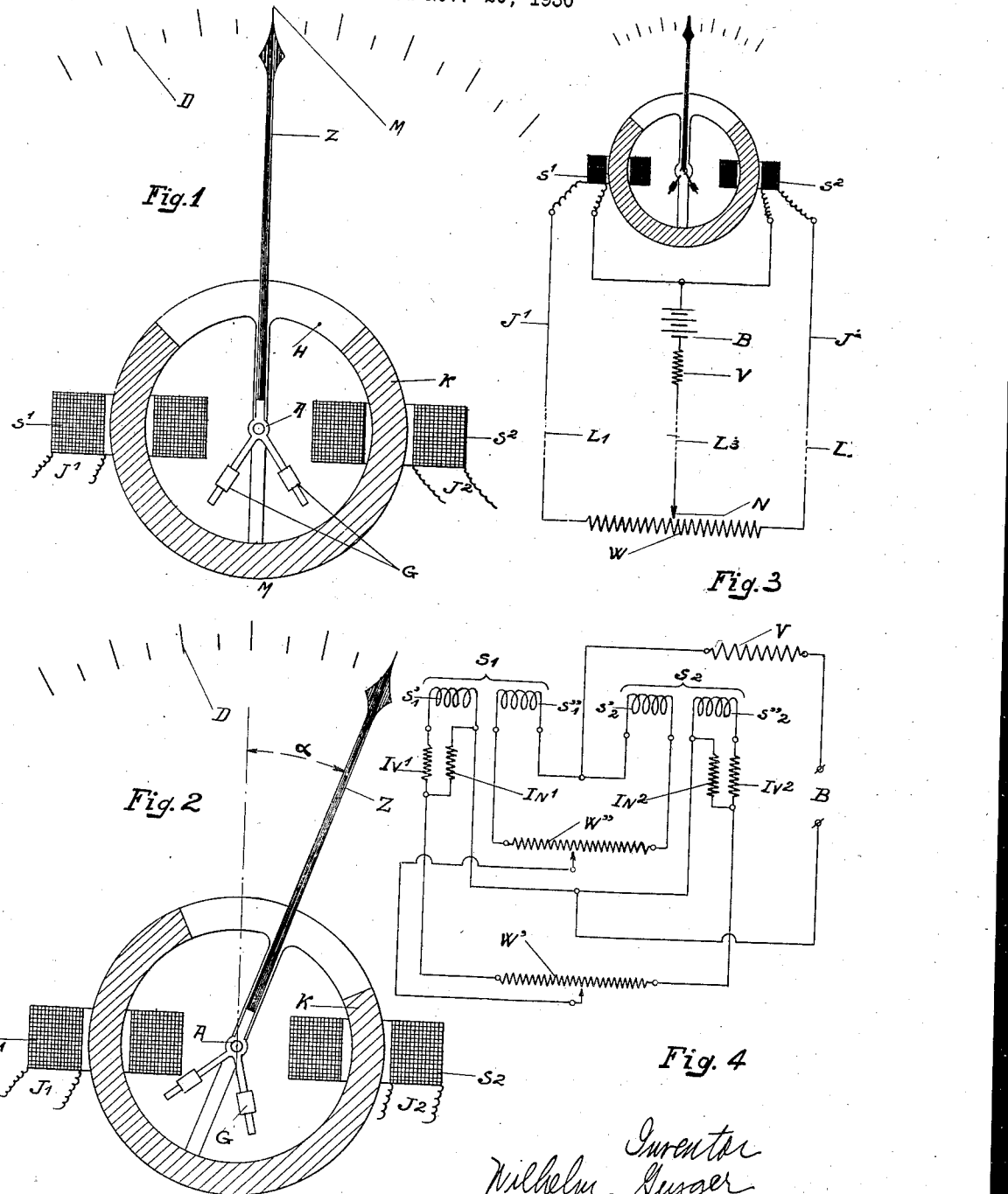

Patented Feb. 27, 1934

1,948,912

UNITED STATES PATENT OFFICE 1,948,912

ROTATING ARMATURE-QUOTIENT MEASURING INSTRUMENT

Wilhelm Geyger, Dusseldorf, Germany

Application November 20, 1930, Serial No. 497,028
In Germany November 22, 1929

3 Claims. (Cl. 171—95)

The heretofore known moving iron quotient or exponent of ratio meters can, as regards their design be divided into two principal groups. In the case of the first of these groups two measuring devices of round coil or flat coil moving iron instruments are superimposed on a common axis and the iron cores or the coils are arranged in such a manner that the two measuring devices produce opposing turning moments, whereas in the second group one moving iron core is used instead of two, it being subjected to the influence of the magnetic fields of two coils or coil groups. Such moving iron quotient measuring instruments can be used both with direct and alternating current, and moreover possess the advantage that they have no current carrying leads to the moving organs of the instrument. But on the other hand it is very difficult to obtain a predetermined scale characteristic, because it is impossible to ascertain it by calculation.

The object of the invention is to provide an improved moving iron quotient measuring instrument which presents technical advantages over the usual measuring instruments of this type, and has a predetermined known scale which is determined by the peculiar action of the measuring elements. The assembly of the measuring device is also extremely simple and easily understandable. The turning moment produced is, although the element producing such turning moment is of comparatively light weight, so great that a very high value of the mechanical efficiency factor (according to the Keinath definition) is obtained, which is a determining factor as greatly promoting the accuracy of adjustment of the moving system.

With the above and other objects in view, the invention consists in the construction, combination and arrangement of devices hereinafter described and claimed.

On the drawing:

Figs. 1 and 2 show schematically the general construction of the measuring instrument;

Figs. 3 and 4 are plans of switchboards for the combination with long distance sending apparatus.

In the form of the invention shown in Figs. 1 and 2, K is a substantially circular iron core which in practice is stamped from a highly permeable transformer sheet alloy and has an interruption or space of a width of about 270° in one side. An indicator hand Z is secured on a bar which extends diametrically across the core at a point at the center of the interruption and said hand is provided with downwardly diverging arms which are provided with adjustable weights G. The core and the hand are pivotally mounted on an axis A for simultaneous movement, the said axis A coinciding with the center of the core and the outer and inner peripheries of the core being concentric with the axis. An intermediate member H of non-magnetic material such as brass extends across the interruption of the core.

At diametrically opposite sides of the core are coils $S_1$, $S_2$ which are relatively fixed and through the centers of which the opposite sides of the core pass, the said core, together with the hand and the balancing weights G, being freely movable. The hand Z plays over a scale or dial indicated at D. It will be noted that the centers of the circles are arranged symmetrically to the axis of rotation so that the breadth of the iron core decreases on both sides in the direction of the air gap or interruption and that the turning moment decreases, but the proportional sensitivity increases.

The moving iron quotient or exponent of ratio measuring instrument is, by reason of its linear course of the scale and its great turning moment, especially suitable for registering devices for transmitters of the class in which a sliding contact is moved on a resistance wire proportionally to the variation of the quantity to be measured. The device is also adapted for use in conjunction with a transmitter or any desired number of them, for the purpose of indicating in the latter case the sum, the difference, or the arithmetical mean value or average of the quantities measured.

If two direct currents or two alternating currents of equal phase $J_1$ and $J_2$ flow through the two coils $S_1$ and $S_2$, these currents create two electro magnetic turning moments of opposite sense on the iron core K, that is to say the current $J_1$ flowing in the coil $S_1$ causes a turning moment in clockwise direction, and the current $J_2$ flowing through the coil $S_2$ creates a turning moment in anti-clockwise direction. If $J_1=J_2$ the iron core assumes a symmetrical position in respect of the coils $S_1$ and $S_2$ and the hand Z takes up a position over the middle of the scale (center position of the moving system); but if $J_1$ is greater or less than $J_2$ the moving system is according to Fig. 2 deflected from its central or zero position by the amount of a definite angle.

If $Z_1$ and $Z_2$ designate the number of turns of $S_1$ and $S_2$ a single deflection shows that:

$$\alpha = \text{const.} \frac{J_1.Z_1 - J_2.Z_2}{J_1.Z_1 + J_2.Z_2} \qquad (1)$$

If the coils $S_1$ and $S_2$ have the same number of turns $(Z_1=Z_2)$, $\alpha$ becomes:

$$\alpha = \text{const.} \frac{J_1-J_2}{J_1+J_2} \qquad (2)$$

If the coils $S_1$ and $S_2$ are traversed by two currents $J_1$ and $J_2$, the sum whereof is constant $(J_1+J_2=\text{const.}=10)$ and if the proportion $J_1:J_2$ is regularly modified, there is for example obtained the deflection of the scale characterized by the following schedule:

| $J_1:J_2$ | $J_1+J_2$ | $J_1-J_2$ | $\frac{J_1-J_2}{J_1+J_2}\alpha$ |
|---|---|---|---|
| 1:9 | 10 | −8 | −0,8−const. 0,8 |
| 2:8 | 10 | −6 | −0,6−const. 0,6 |
| 3:7 | 10 | −4 | −0,4−const. 0,4 |
| 4:6 | 10 | −2 | −0,2−const. 0,2 |
| 5:5 | 10 | 0 | 0 |
| 6:4 | 10 | +2 | +0,2+const. 0,2 |
| 7:3 | 10 | +4 | +0,4+const. 0,4 |
| 8:2 | 10 | +6 | +0,6+const. 0,6 |
| 9:1 | 10 | +8 | +0,8+const. 0,8 |

Experimental measurements with a quotient-measuring instrument constructed according to Figs. 1 and 2 have practically proved that the present invention shows effectively this deflection of graduation discovered theoretically in advance. Hence it was shown that the "mechanical quality coefficient $\alpha$" (according to the Keinath definition) (Elektrothermie, George Keinath, 1885) decisive for the security of adjustment of the movable system, acquires a proportionally high value in such a measuring instrument. In an indicating instrument having an air damping device and a base diameter of 225 mm., there resulted a system-weight of 4 g., a rotation moment of 2 gcm. (for a deflection of 90°) and thus the value $$\alpha = \frac{10.2}{41.5} = 2.5$$

for the mechanical quality coefficient. For a recorder, provided with an electromagnetical damping device, there resulted for a system-weight of 30 g. and a rotation moment of 25 gcm. (for a deflection of 90°) the quality coefficient $$\alpha = \frac{10.25}{31.5} = 1.5.$$

The indicated consumption of current by the measuring coils was in both such instances normal.

For alternating current the same results are obtained as for continuous current as long as the currents $J_1$ and $J_2$ have the same phase. The use of the measuring instrument is however also possible for phase-displaced currents.

Owing to the linear character of the scale, characteristic for the above described measuring instrument, and owing to proportionally high rotation moments being at disposition, the object of the present invention has a very special importance as an indicating and writing or recording device for long distance measurements in combination with long distance transmitters, i. e. for electrical long distance transmissions of index positions. When making such measurements, the axis of the pointer of the transmission device, the index position whereof shall be transmitted at long distance, is mechanically coupled with a resistance having a sliding contact, designated as long distance transmitter (sending device), so that to each pointer position of the transmission apparatus corresponds a determined position of the sliding contact and thus a determined proportion of resistance. The variable resistance of the long-distance sending device comprises generally a long resistance wire, which is placed in regular narrow zig-zag on the periphery of a small cylinder of insulating material. The arrangement is made in such a manner that equivalent values of resistance correspond to equivalent angles. On the resistance cylinder slides a sliding contact producing a slight pressure and having the outer form of a sliding spring or sliding-brush.

Both ends of the resistance and the sliding spring are connected with three wire clamps for the three long-distance lines. The long-distance sending cylinder may remain out of operation, while the contact spring turns with the transmitting axis, or conversely the long distance sending cylinder may be placed on the pointer axis or be connected to it by means of a reducing coupling, while the sliding spring is not movable. In both cases the contact sliding spring divides the resistance in two parts, the variable proportions of which are measured by means of a quotient measuring instrument serving as receiving apparatus. Because the characteristic of resistance proportions in such a transmitting device is a linear one, and as it is the same with reference to the deflection of the scale of the measuring device, one obtains for writing apparatus an undeformed and exactly planimetric graduation curve of the registration strip.

When the instrument is to be used in connection with long distance systems, the wiring is as shown in the diagram Figure 3. W designates the resistance wire of the sending apparatus for long distances and N the sliding spring which divides the resistance W into two parts, the variable proportions of which are to be measured. The ends of the resistance wire W are connected by long distance lines $L_1$, $L_2$, with the two coils $S_1$ and $S_2$ (which have the same number of windings) of the rotating armature quotient measuring instrument. Said coils are also connected together and to the line $L^3$ which leads to the sliding spring N, and which includes the series resistance V and the storage battery B. The connection represents a branching off of current wherein the proportion of the two branches $J_1$ and $J_2$ may be varied by displacing the sliding spring N within determined limits. Each position of the spring N corresponds with a determined angular position of the pointer Z fixed on the system axis of the quotient measuring device.

If $R_1$ and $R_2$ designate the respective total resistances of both branches, and E the total active voltage at the branch joint, the currents $J_1$ and $J_2$ flowing within the coils $S_1$ and $S_2$ are determined by the following equations:

$$J_1 = \frac{E}{R_1}, \quad J_2 = \frac{E}{R_2}.$$

If these values are introduced into the Equation (2) in lieu of $J_1$ and $J_2$, one obtains:

$$\alpha = \text{const.} \frac{\frac{E}{R_1}-\frac{E}{R_2}}{\frac{E}{R_1}+\frac{E}{R_2}}$$

or $$\alpha = \text{const.} \frac{R_2-R_1}{R_2+R_1} \qquad (3)$$

The following is a numerical example: The resistance of the coils $S_1$ and $S_2$ and of the long-distance lines $K_1$ and $K_2$ may be 10 ohm and the total resistance W of the long-distance sending apparatus=80 ohm; then it results the deflection of scale characterized by the following table:

| $R_1$ | $R_2$ | $R_2+R_1$ | $R_2-R_1$ | $\frac{R_2-R_1}{R_2+R_1}\alpha$ |
|---|---|---|---|---|
| ohm | ohm | ohm | ohm | |
| 10 | 90 | 100 | +80 | +0,8+const. 0,8 |
| 20 | 80 | 100 | +60 | +0,6+const. 0,6 |
| 30 | 70 | 100 | +40 | +0,4+const. 0,4 |
| 40 | 60 | 100 | +20 | +0,2+const. 0,2 |
| 50 | 50 | 100 | 0 | 0       0 |
| 60 | 40 | 100 | −20 | −0,2−const. 0,2 |
| 70 | 30 | 100 | −40 | −0,4−const. 0,4 |
| 80 | 20 | 100 | −60 | −0,6−const. 0,6 |
| 90 | 10 | 100 | −80 | −0,8−const. 0,8 |

If such a receiving apparatus is used as recording apparatus (f. i. ink writer), the calibration table of the recording film is not deformed and it is thus exactly planimetric.

If more variable values are to be measured at the same moment and if their arithmetical middle is to be indicated by the receiving apparatus, both coils $S_1$ and $S_2$ are subdivided in a number of parts equivalent to the values to be measured, the windings of the individual divisions alternating advantageously in such a manner the one with the others that all divisions exercise the same influence on the iron core. The mutual corresponding divisions of both coils form, as shown in Fig. 3, a circuit with the resistance wire of a long distance sending apparatus. All circuits formed in this manner are connected in series in a circuit containing the battery in such a way that the circuit enters in each of the individual circuits at a point between both coils and exists at the sliding contact or conversely.

Fig. 4 shows an embodiment of such a connection for measuring the sum, the difference or the arithmetical mean of two values to be measured (f. i. quantities) i. e. for the registration by means of a recorder. Each of the coils $S_1$ and $S_2$ comprises two mutually separated entirely similarly constructed parts (f. i. two well insulated, simultaneously narrowly wound wires) $S'_1, S''_1$ and $S'_2, S''_2$. The first long distance sending apparatus W' is joined to the coils $S'_1, S'_2$ and the second W'' to the coils $S''_1, S''_2$. The auxiliary resistances $IV^1, IN^1, IN^2, IV^2$ serve for taking into consideration the proportion in size of both items. Both measuring circuits of the long-distance sending apparatus are put in series in the manner shown in Fig. 4 and connected to a source of current B by passing through a series resistance.

This summation connection is founded on the fact that the ampere windings of the coils $S_1$ and $S_2$ acting on both sides of the iron core K (Figs. 1 and 2) correspond to the arithmetic middle of the ampere windings of the respective partial coils. Experimental testings have practically proved that an improvement in rotating armature—quotient measuring instruments, comprising subdivided coils, and corresponding to the object of invention, measures the total, the difference or the arithmetic mean of several measuring values with the greatest exactness, the latter not depending upon the difference in size of the individual items. The measuring exactness of each item—contrary to other known summation connections—is essentially the same, because the size of the individual items is not taken into consideration, owing to a variation of the long-distance sending resistances, but by means of auxiliary resistances (see $IV^1, IN^1, IN^2, IV^2$, Fig. 4). The summation connection according to Fig. 4 also offers the advantage that long-distance sending apparatus of normal form can be employed without the necessity of being changed.

I claim:

1. Quotient measuring apparatus comprising a pivotally mounted interrupted circular core, an indicator hand movable therewith, a scale to indicate the position of said hand, a pair of relatively fixed coils through the centers of which the opposite sides of the core pass and are free to move, each of said coils comprising two mutually separated entirely similar parts, a conductor forming a closed circuit including one part of each coil and also including a resistance; a second conductor forming a closed circuit including the other part of each coil and also including a resistance between said coil parts; a circuit connected to said conductors and including a source of current and a resistance, and a sliding contact movable on the first named resistance and operated by the said interrupted circular core.

2. Electrical measuring apparatus as claimed in claim 1, including a shunt conductor connecting in shunt the leads of the second named conductor and also including resistances in said leads and in said shunt conductors.

3. Electrical measuring apparatus as claimed in claim 1, including a contactor brush shiftable on the second named resistance.

WILHELM GEYGER.